Feb. 2, 1926.
J. J. HOLLEY
AUTOMOBILE SIGNAL DEVICE
Filed June 13, 1924
1,571,722
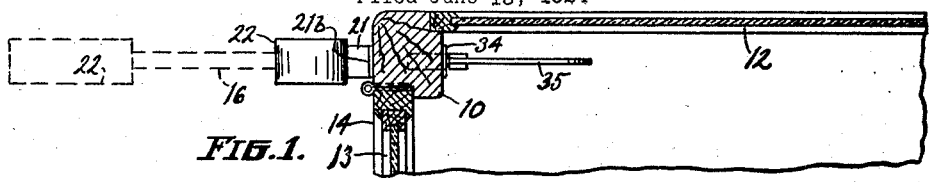
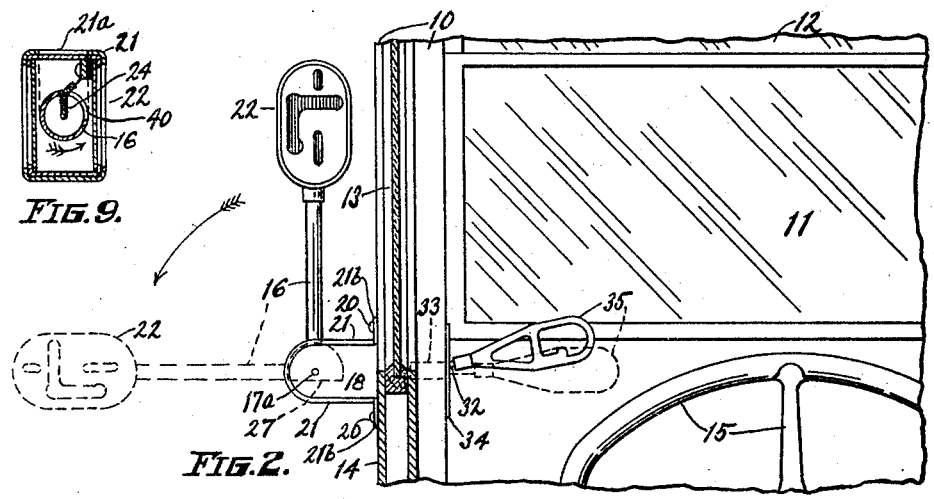
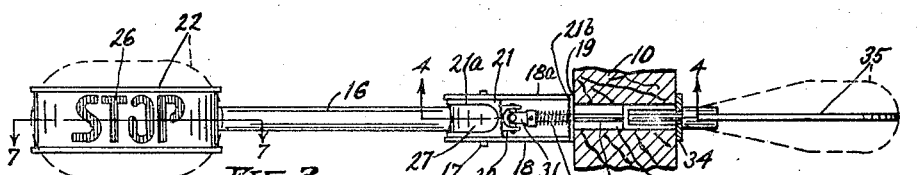
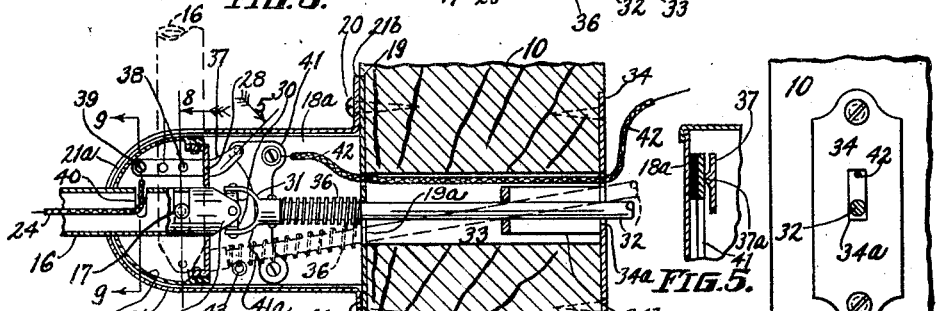
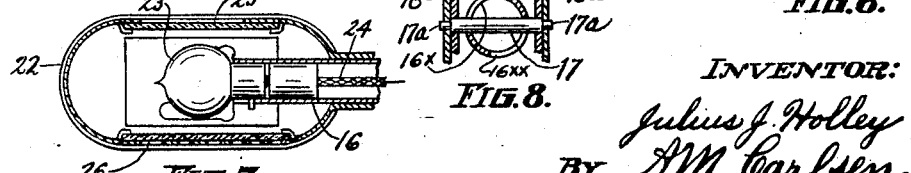
INVENTOR:
Julius J. Holley
BY A. M. Carlsen
ATTORNEY.

Patented Feb. 2, 1926.

1,571,722

UNITED STATES PATENT OFFICE.

JULIUS J. HOLLEY, OF LA CROSSE, WISCONSIN.

AUTOMOBILE SIGNAL DEVICE.

Application filed June 13, 1924. Serial No. 719,805.

*To all whom it may concern:*

Be it known that I, JULIUS J. HOLLEY, a citizen of the United States, residing at La Crosse, in the county of La Crosse and State of Wisconsin, have invented certain new and useful Improvements in Automobile Signal Devices, of which the following is a specification.

My invention relates to signalling devices for automobiles and other vehicles and the object is to provide a simple, efficient and inexpensive device particularly adaptable for the usual turning signals and also useful as a so-called parking light or stop signal.

In the accompanying drawing:

Fig. 1 is a top view of my device as mounted on the front, left corner post of an automobile body, the latter shown in section.

Fig. 2 is a rear view of Fig. 1 showing the car body in vertical section and my device in non-signaling position.

Fig. 3 is an enlarged partly sectional view of my device extended horizontally for signalling purposes.

Fig. 4 is an enlarged vertical, sectional view about as on line 4—4 in Fig. 3 and disclosing the housed mechanism with which the signal is manipulated and caused to be illuminated.

Fig. 5 is an enlarged section on the line indicated by arrow 5 in Fig. 4.

Fig. 6 is a right hand end view of Fig. 4.

Fig. 7 is an enlarged sectional view as on line 7—7 in Fig. 3, showing the illuminating and illuminated signalling means of the signal arm.

Fig. 8 is an enlarged vertical, sectional detail mainly of the signal arm tube and its fulcrum, about as on line 8 in Fig. 4, and Fig. 9 is a sectional elevation as on line 9—9 in Fig. 4.

Referring to the drawing by reference numerals, I have shown my device as mounted on the front left corner post 10 of an automobile body of the inclosed type. 11 is the front, lower windshield, 12 the upper windshield and 13 the window sash of the front, left door 14 and 15 is the steering wheel of the auto, all in their respective and approximate relative positions.

My device involves the use of a normally vertical signal arm containing automatically illuminated signalling means at its free end when it is swung to horizontal position at right angles from the side of the auto. The signal arm proper is preferably a metal tube 16 pivotally mounted on a horizontal stub shaft 17 the opposite ends of which are reduced as at 17$^a$ (see Fig. 8) and are rotatable in the horizontally spaced walls 18—18$^a$ of a mechanism housing 22. Said housing has an integral vertical plate 19 adapted to be secured as with screws 20 to the side of post 10. The outer ends of the said walls may be rounded concentrically with axle 17 and both are covered by a shell 21 curved to cover said rounded portions and also provided with flanges 21$^b$ adapted to be secured to post 10 by the same screws 20. A completely inclosed mechanism housing is thus formed except that the half round outer portion of the shell has a slot 21$^a$ forming a quarter circle and allowing the arm 16 to be swung from vertical to horizontal position or vice-versa, as indicated most clearly in Fig. 4.

The outer end of arm 16 terminates within and is secured to an elongated, hollow head 22 preferably quadrangular in cross section and flat in a vertical plane at right angles to the side of the auto. I will designate the narrow sides as the edges and the other sides as the faces. The end of tube 16 carries an electric bulb 23 which is automatically lighted by current from a wire 24 and illuminates the head 22 throwing light out through openings on its four sides. When the signal arm is in vertical position (see Fig. 2) its faces are exposed forwardly and rearwardly, each face having openings with translucent colored material and said openings should be in the form of a letter L as shown. Thus when the signal arm is swung out to horizontal position the illuminated letters L will be exposed forwardly and rearwardly, indicating that the driver is about to make a left turn of the car.

When the signal arm is in the horizontal signalling position it may be given a quarter turn so that the openings in its edges throw light forwardly and rearwardly. The forwardly exposed edge may have a clear or frosted glass 25 throwing a white light and the rear edge preferably has a red glass 26 allowing red light to be thrown rearwardly through openings in the head preferably forming the word "Stop". The illuminated word "Stop" and simultaneous white light forward thereof may be used when the driver is about to stop the car or when he has stopped the car and intends to leave it for some time.

I will now describe the means in my device wherewith the driver of a car operates the signal arm and turns the head 22 to show the desired signals.

That part of arm 16 within the shell 22 is rotatably fixed in a semi-circular housing 27 conforming to the shape of the outer end of housing 22 and rotatable in a vertical plane within said housing on shaft 17. Said housing 27 has a straight wall 28 on the side of shaft 17 opposite its rounded portion (Fig. 4). The arm 16 is inserted in a bore in the rounded portion, thence through a like bore in wall 28 and projects therefrom, said projection formed as two spaced jaws 29 secured pivotally to the ring 30 of a ring type universal joint. Another double jawed member 31 is pivotally secured to ring 30 and is secured on the inner end of a horizontally disposed operating rod 32 extending through a vertical slot in plate 19, thence through a bore 33 in post 10 and a slot 34$^a$ of a plate 34 secured on the inner side of the post and its free end provided with a flattened handle 35. This handle is directly in front of the auto driver (see Fig. 2). A compression coil spring 36 is placed about rod 32, between plate 19 and jaw member 31. When the signal arm is in vertical position the universal joint is below shaft 17 and the spring 36 tends to hold it there.

34$^b$ is a horizontally disposed U-shaped, integral part of plate 34 extending into bore 33, its inner end bored for slidable engagement of the rod 32 and acting as a fulcrum for it. Thus when the driver wishes to swing the signal arm to horizontal position he pulls the handle 35 toward the right against the pressure of coil spring 36, causing rod 32 and arm 16 to come into linear horizontal position shown in Figs. 3 and 4, and the signal arm stays there mainly because of its own weight. When the signalling is completed the operator merely pushes upwardly on the handle 35 and rod 32 will rock on its fulcrum in bracket 34$^b$ causing the universal joint to be pushed downwardly below the horizontal line and the spring 36 will immediately push the joint to its lowest position and the signal arm is brought back to its original vertical position. The semi-circular housing 27—28 is simultaneously turned in a vertical plane. This housing has a radial electro-conductive arm 37 with an internal part secured as at 38 to its side wall and having a contact screw 39 holding one end of the wire 24 which carries current to bulb 23, the said wire extending into the arm 16 through a transverse slot 40 in said arm. The arm 37 may have a small hump 37$^a$ (Fig. 5) continuously and frictionally engaging an arched plate 41 secured to the adjacent side wall 18$^a$ of the mechanism housing 22. Said plate is electrically connected to wire 42 from any suitable source of electricity not hown). Thus electric current is continuously conveyed to the electric bulb when arm 16 is in signalling position, but plate 41 is notched at its lower end, as at 41$^a$, so that contact arm 37 breaks circuit when reaching said notch and at which time the signal arm is in its vertical position and no light is necessary. 43 is a small metal stud in the path of arm 37 and has a slight hollow adapted to receive and yieldingly hold the bump 37$^a$ of arm 37 (as in Fig. 6) to aid in holding the signal arm in vertical position.

As previously described the signal arm is fulcrumed on shaft 17, but to allow the signal arm to be rotated a quarter turn on its own axis for exposing the desired signals described, the tubular arm 16 is provided with transversely registering slots, one as 16$^x$ extending upwardly from shaft 17 on one side, approximately 90 degrees, and the other as 16$^{xx}$ (Fig. 8) downwardly on the other side of the shaft a like distance. This permits rotation of shaft 16 in the direction of arrow 44 (Fig. 8) for the purpose described.

The operation of my device has been fully disclosed in the foregoing description.

What I claim is:

In a signal device for vehicles, a mechanism housing adapted to be secured on the side of a vehicle, a signal arm pivotally secured in said housing and adapted to be swung in a vertical plane at right angles to the side of the vehicle; said arm comprising a tubular member with an elongated hollow head, quadrangular in cross section, on its free end, an electric bulb in said head and in an electric circuit, means for closing the circuit, means in said head for projection of light forwardly and rearwardly, simultaneously, when the circuit is closed; means for manipulating the signal arm to and from a horizontal position comprising an operating rod having a universal joint connection with the signal arm adjacent its pivot and movable in a common plane with the movement of the signal arm, and in which said circuit closing means comprises a fixed electro-conductive element within said mechanism housing, a radial electro-conductive arm in frictional contact with said fixed element and oscillated by the movement of the signal arm, an opening being provided in said fixed element in the path of said radial arm to break the circuit when the signal arm is in idle position, and means for conducting electric current from said arm to the electric bulb in the head of the signal arm; and auxiliary means for holding the signal arm in non-signaling position comprising a fixed stud within the mechanism housing, in the path of the radial arm and adapted to engage and yieldingly hold said arm.

In testimony whereof I affix my signature.

JULIUS J. HOLLEY.